(No Model.)
H. WYMAN.
MECHANICAL MOVEMENT.
No. 275,109.  Patented Apr. 3, 1883.
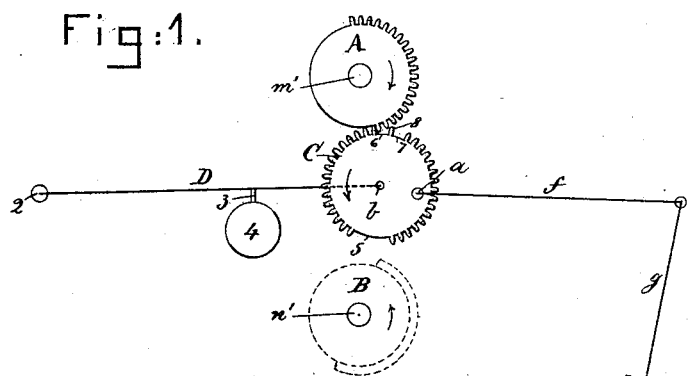
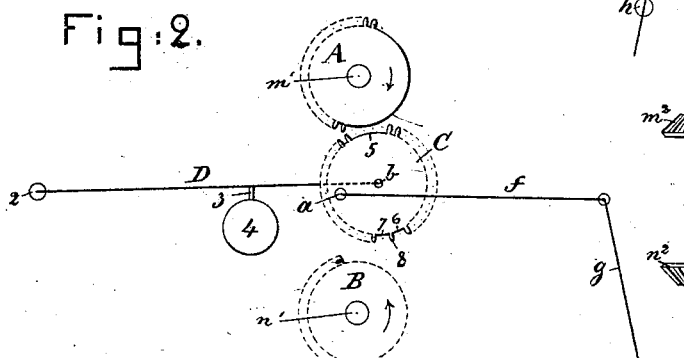
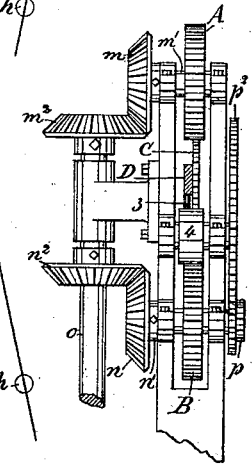
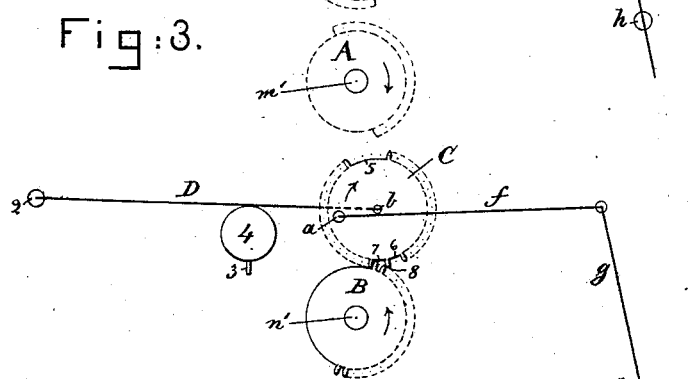
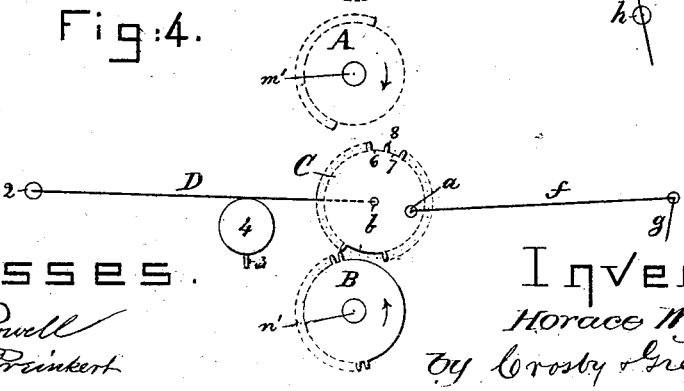
Witnesses.
Fred A. Powell
John F. C. Preinkert
Inventor.
Horace Wyman
by Crosby & Gregory Attys.

UNITED STATES PATENT OFFICE.

HORACE WYMAN, OF WORCESTER, MASSACHUSETTS, ASSIGNOR TO GEORGE CROMPTON, OF SAME PLACE.

MECHANICAL MOVEMENT.

SPECIFICATION forming part of Letters Patent No. 275,109, dated April 3, 1883.

Application filed November 3, 1882. (No model.)

*To all whom it may concern:*

Be it known that I, HORACE WYMAN, of Worcester, in the county of Worcester and State of Massachusetts, have invented an Improvement in Mechanical Movements, of which the following description, in connection with the accompanying drawings, is a specification, like letters on the drawings representing like parts.

This invention has for its object to always insure the movement, first in one and then in the opposite direction for a little more than half a rotation, or one hundred and eighty degrees, of a crank-carrying toothed wheel, whereby the crank-pin thereon may always pass the center of the gear in going from one to its other extreme position, so that the said wheel will not slip back under the strain of the connecting-rod and lever actuated by the crank-pin of the toothed wheel when the toothed partial gear which turns the said wheel passes out of engagement with it.

The mechanical movement herein described as embodying this invention comprises a lever carrying a toothed wheel provided with two engaging-spaces and with one disengaging-space, as will be described, a crank-pin on the said toothed wheel, and two partial gear—one above and the other below the said toothed wheel—and a connecting-rod and a lever, which is to be actuated first in one and then in an opposite direction, and remain at rest at the end of each movement until the toothed wheel is shifted into engagement with the partial gear opposite the one which last operated the toothed wheel.

Figure 1 represents in elevation sufficient mechanism to illustrate my invention, the toothed wheel being shown as just engaged by the upper of the two partial gears. Fig. 2 shows the upper partial gear as having turned the toothed wheel and run out of gear with it, leaving the toothed wheel at rest. Fig. 3 shows the toothed wheel as just lowered into contact and engagement with the lower partial gear. Fig. 4 shows the said toothed wheel as having been turned by the lower partial gear and left at rest, and Fig. 5 shows means for connecting and moving the partial gear in unison.

Referring to the drawings, A B represent two partial gear or gear having teeth partially about them, and supported in suitable fixed bearings, and having rotary motion in opposite directions, as designated by the arrows thereon.

The toothed wheel C, to be moved alternately in opposite directions by the teeth of the rotating partial gears above and below it, has at one side of it a crank-pin, $a$. The wheel C turns on a center-pin or stud, $b$, fastened to a lever, D, having its fulcrum at 2, and extended across that face of the toothed wheel which does not carry the crank-pin. The toothed wheel is adapted to be raised or lifted so that its teeth may be engaged by the teeth of the partial gear A by a pin or projection, 3, on a rotary shaft, 4, and when a pin which supports the said lever D passes from contact with its under side, as in Figs. 3 and 4, the lever and toothed wheel drop, and the latter is then engaged by the lower partial gear, B. The crank-pin $a$ is joined by link $f$ with a lever, $g$, pivoted at $h$, and in the operation of the mechanism the lever $g$ is vibrated in first one and then in the other direction, and is left at rest for a longer or shorter period at the end of each stroke; and the object of my invention is to so construct the said toothed wheel and combine it with the partial gears A B that the latter will turn the toothed wheel for a little more than one-half a rotation, to leave the crank-pin $a$ in such relation to the axis or center-pin $b$ of the toothed wheel that strain on the lever $g$, when the teeth of the partial gear run out of mesh with the teeth of the toothed wheel, will not cause the toothed wheel to turn or fly back quickly and out of time, as would be the case if the crank-pin, in moving from one to its opposite position, were carried over for a distance less than one hundred and eighty degrees of a circle.

The toothed wheel, at one portion of its periphery, has omitted from it, as herein shown, four teeth, to form a long disengaging-space, to permit the teeth of the partial gear to unmesh from or run out of mesh from the toothed wheel and leave it at rest; but at its opposite edge the said wheel has two independent engaging-spaces, 6 7, each formed by the omission of one tooth, and the said spaces are shown as separated by a single tooth, 8. If the partial gears which actuate the toothed wheel fail to turn it fully one hundred and eighty degrees, it happens in the rapid working of the apparatus that the strain on the lever $g$ will sometimes cause the link $f$, pulling on the crank-pin $a$, to turn the toothed wheel C back quickly out of time, which evil I effectually overcome by providing the toothed wheel C with two independent engaging-spaces, 6 7, one of which serves as an engaging-space when the wheel C is to be moved in one direction, and the other when the wheel C is to be moved in the opposite direction, for the teeth of the partial gears are thus enabled to mesh with the teeth of the said toothed wheel at different distances from the crank-pin $a$, (see Figs. 1 and 3,) and under all circumstances turn the said toothed wheel C and its crank-pin in each direction of its rotation enough more than one hundred and eighty degrees to always insure the retention of the toothed wheel in the position in which it is left by the partial gear which moved it, or to always carry the crank-pin $a$ from its position Fig. 1 to its position Fig. 2, or vice versa—a distance greater than one hundred and eighty degrees.

The partial gear A, when operative to turn the toothed wheel C, always engages or meshes its leading tooth with the engaging-space 6 of the toothed wheel, as in Fig. 1—the space farthest from the crank-pin $a$—and having turned the toothed wheel for a distance greater than one hundred and eighty degrees, as in Fig. 2, the teeth of the said partial gear run out of mesh from the teeth of the said toothed wheel at the disengaging-space 5, leaving the toothed wheel C at rest.

To carry the crank-pin $a$ from the position Fig. 2 back in the opposite direction for a distance greater than one hundred and eighty degrees, the lever D is permitted to fall and place the engaging-space 7, it occupying a position nearer the crank-pin $a$ than the space 6, in position to be engaged by the leading tooth of the partial gear B, as in Fig. 3; and the latter, in its continued rotation, turns the crank-carrying toothed wheel C over a distance greater than one hundred and eighty degrees, as indicated in Fig. 4, when the teeth of the partial gear B run out of mesh from the teeth of the said crank-carrying toothed wheel at the disengaging-space 5, again leaving the toothed wheel at rest. The crank or crank-pin $a$ of the wheel C being thus always carried past the "center," as it is commonly termed, the said wheel cannot fly or be turned back out of time by strain on the lever $g$, as would be the case at times if the crank-pin were carried only one hundred and eighty degrees, or if by accident or looseness in the mesh of the teeth the crank-pin were carried a little less than one hundred and eighty degrees and the teeth of the partial gear then run out of mesh from the teeth of the toothed wheel.

In Fig. 5 the gear $m$ at the end of the shaft $m'$ of the partial gear A, and the gear $n$ at the end of the shaft $n'$ of the partial gear B, are engaged and moved by the bevel-gears $m^2$ $m^2$, fast upon the rotating shaft $o$. The shaft $n'$ has at its opposite end a pinion, $p$, which engages a large toothed gear, $p^2$, on the end of and rotates the shaft 4. In Fig 5, I have shown the lever D in section, rather than by a single line, as in the other figures.

I claim—

The crank-carrying toothed wheel having a disengaging-space, 5, and two independent engaging-spaces, 6 7, located at different distances from the crank of the toothed wheel, a lever to support and move the axis or center-pin $b$ of the said toothed wheel, and a connecting-rod and attached lever to be moved by the said crank-pin, combined with two partial gear adapted to be rotated in opposite directions, the one to engage the said toothed wheel at its space 6, and the other at its space 7, as and for the purposes described.

In testimony whereof I have signed my name to this specification in the presence of two subscribing witnesses.

HORACE WYMAN.

Witnesses:
G. W. GREGORY,
B. J. NOYES.